United States Patent Office 3,383,372
Patented May 14, 1968

3,383,372
ETHYLENE/GLYCIDYL ESTER COPOLYMERS
Ben E. Spivey, Lake Jackson, Tex., assignor to The Dow Chemical Company, Midland, Mich., a corporation of Delaware
No Drawing. Filed May 21, 1965, Ser. No. 457,826
2 Claims. (Cl. 260—86.7)

ABSTRACT OF THE DISCLOSURE

Ethylene copolymers are prepared by polymerizing ethylene with a glycidyl ester having the formula

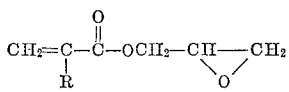

where R is hydrogen or an alkyl group having 1 to 2 carbon atoms.

The ethylene copolymers have been found to be useful alone or modified with fillers and plasticizers as molding compositions for the manufacture of useful films and coatings.

---

The present invention relates to ethylene copolymers and more particularly to copolymers of ethylene and glycidyl ester.

According to the present invention ethylene copolymers are prepared by polymerizing ethylene with a glycidyl ester having the formula

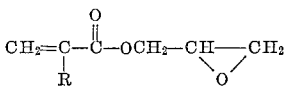

wherein R is hydrogen or an alkyl group having 1 to 2 carbon atoms.

Glycidyl esters which are embraced by the above formula include glycidyl acrylate, glycidyl methacrylate and glycidyl ethacrylate.

The ethylene/glycidyl ester copolymer compositions of the present invention are obtained by reacting a major proportion of ethylene i.e. from about 50 to about 97 percent by weight with about 3 to about 50 percent by weight of glycidyl ester.

The copolymers can be prepared by procedures known to the art, for example, by polymerizing mixtures of ethylene and glycidyl ester either in tubular or autoclave reactors at pressures above about 500 atmospheres, e.g. from about 10,000 to 50,000 pounds per square inch or higher, and at temperatures from about 100° C. to about 300° C. using, at catalytically effective concentrations, free radical producing polymerization catalysts as azo catalysts like, α,α-azobisisobutyronitrile and peroxygen-type catalysts such as diethyl peroxide, hydrogen peroxide, di-tertiary butyl peroxide, persuccinic acid, lauroyl hydroperoxide, tetrahydronaphthalene peroxide, alkali metal, alkaline earth metal or ammonium persulfates, perborates, percarbonates, and the like. Such catalysts usually are used in the range from about 0.01 percent to about 0.2 percent, based on the weight of the monomers.

The ethylene copolymers of the present invention either alone or modified with fillers, synthetic resins and plasticizers find uses as molding compositions for the manufacture of useful films and coatings.

At temperatures above 200° C. the copolymers are cross-linkable and are highly useful as adhesives and may be used as the resinous binding ingredient in the production of laminate articles of construction such as bound layers of metals such as aluminum, wood, paper, glass and the like.

To illustrate the manner in which the invention may be carried out, the following example is given. It is to be understood, however, that the example is for the purpose of illustration and the invention is not to be regarded as limited to any of the specific materials or conditions recited therein. Unless otherwise stated, all percentages cited in the example below are based on weight.

Example

Ethylene and glycidyl methacrylate (GMA) were copolymerized in a series of runs identified and further described in Table I below. The runs were carried out in a continuous manner in a 3-liter pressure autoclave stirred at 1,200 r.p.m. at a temperature of 200° C., and a pressure between 15,000 and 21,000 p.s.i., using as a catalyst α,α-azobisisobutyronitrile at a concentration of 3 percent by weight. Table I shows the average rate of feed of ethylene in pounds per hour, and the percentage amount of the glycidyl methacrylate comonomer mixed with the ethylene feed introduced into the autoclave. The amount of glycidyl methacrylate found in each copolymer product produced is also shown.

Table I further shows properties of the resulting copolymer products.

Melt Index is measured by ASTM D–1238–57T.

Tensile and yield strength in p.s.i. and elongation in percent of original length at break are measured by ASTM D–638–58T on specimens cut using die B on ASTM D–412–51T pulled at 10 inches per minute.

Rigidity is by ASTM D–747–58T.

Hardness is by Shore C method.

TABLE I

| Run Number | 1 | 2 | 3 | 4 | 5 | 6 |
|---|---|---|---|---|---|---|
| Ethylene Feed Rates, lbs./hr | 49.0 | 50.0 | 50.0 | 50.0 | 50.0 | 50.0 |
| Percent GMA in Feed | 1.17 | 0.75 | 1.6 | 2.0 | 2.8 | 3.38 |
| Percent GMA in Product | 8.0 | 11.0 | 15.8 | 19.6 | 23.5 | 29.3 |
| Melt Index | 107.6 | 0.24 | 0.5 | 30.0 | 76.0 | 72.0 |
| Tensile, p.s.i. | 1,515 | 1,835 | 1,588 | 1,126 | 795 | 608 |
| Yield, p.s.i. | 1,515 | 1,372 | 1,106 | 958 | 770 | 565 |
| Elongation, Percent | 73 | 490 | 505 | 515 | 428 | 500 |
| Rigidity×10⁻⁴ | 1.78 | 1.64 | 1.15 | 0.81 | 0.59 | 0.37 |
| Hardness | 75 | 75 | 71 | 63 | 59 | 51 |

By way of contrast copolymers of ethylene prepared with other acrylic ester monomers have substantially reduced tensile properties and rigidities when compared to the ethylene/glycidyl methacrylate copolymers of the present invention.

For example, a copolymer of ethylene and ethyl acrylate containing 15 percent by weight ethyl acrylate has a tensile strength of 860 p.s.i. and a rigidity of 0.78. Tensile strength and rigidity of a polymer to a large extent determine the usefulness of the polymer for such applications as films, moldings and coatings.

Samples of some of the copolymers listed in Table I were coated on aluminum sheets by pressing the respective copolymer and an aluminum sheet together for two minutes at a temperature of 116° C. and a pressure of 30,000 p.s.i.

The bond strengths of the copolymers to aluminum were determined by cutting the coated sheets into one inch strips and pulling the coating from the aluminum sheet on a Tinius-Olsen commercial tester at a cross-head speed of 2 inches per minute. The force required to separate the copolymer coating from the aluminum sheet was recorded in pounds/inch. The bond strengths of the copolymer coatings tested are recorded in Table II below.

TABLE II

| Ethylene/glycidyl methacrylate copolymer prepared in accordance with run number: | Bond strength, lbs./in. |
|---|---|
| 1 | 1.16 |
| 2 | 1.75 |
| 5 | 7.4 |
| 6 | 20.5 |

The ethylene/glycidyl methacrylate copolymers were found to cross-link upon heating at elevated temperatures, as indicated by the decrease in the melt index of the copolymers as heating was continued. As illustration of this property, the melt index of the copolymer prepared in accordance with run number 5 of Table I after heating at 270° C. for varying time intervals is summarized below in Table III.

TABLE III

| Heating time at 270° C. (minutes): | Melt index (ASTM D-1238-57T), g./10 min. |
|---|---|
| 5 | 130.5 |
| 10 | 61.6 |
| 15 | 24.4 |
| 25 | 1.0 |

Results similar to the foregoing may also be obtained when equivalent amounts of glycidyl acrylate or glycidyl ethacrylate are copolymerized with ethylene in place of glycidyl methacrylate.

What is claimed is:
1. A copolymer solid of from about 50 to about 97 percent by weight of ethylene and from about 3 to about 50 percent by weight of a glycidyl ester having the following formula

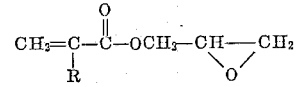

wherein R is selected from the group consisting of hydrogen and an alkyl group having 1 to 2 carbon atoms.

2. The copolymer of claim 1 wherein the glycidyl ester is glycidyl methacrylate.

References Cited

UNITED STATES PATENTS

| | | | |
|---|---|---|---|
| 2,524,432 | 10/1950 | Dorough | 260—86.7 |
| 2,868,760 | 1/1959 | Staicopoulos | 260—86.1 |
| 3,294,769 | 12/1966 | Hicks | 260—86.1 |
| 3,329,661 | 7/1967 | Smith et al. | 260—86.1 |

JOSEPH L. SCHOFER, *Primary Examiner.*

HARRY WONG, Jr., *Examiner.*